United States Patent [19]

Harris et al.

[11] Patent Number: 5,272,244
[45] Date of Patent: Dec. 21, 1993

[54] HYDROXY-FUNCTIONAL POLYETHERS CONTAINING UREA, BIURET, THIOUREA, DITHIOBIURET, THIOAMIDE, AND/OR AMIDE MOIETIES IN THEIR BACKBONE AND URETHANE/UREA PREPOLYMERS AND POLYMERS MADE THEREFROM

[75] Inventors: Robert F. Harris; Michael D. Joseph, both of Midland, Mich.

[73] Assignee: The Dow Chemical Company, Midland, Mich.

[21] Appl. No.: 774,013

[22] Filed: Oct. 8, 1991

Related U.S. Application Data

[63] Continuation-in-part of Ser. No. 485,678, Feb. 27, 1990, Pat. No. 5,055,544, which is a continuation-in-part of Ser. No. 247,460, Sep. 21, 1988, Pat. No. 4,916,201, which is a continuation-in-part of Ser. No. 99,027, Sep. 21, 1987, abandoned.

[51] Int. Cl.$^5$ .............................................. C08G 18/10
[52] U.S. Cl. ........................................ 528/59; 528/60; 528/61; 528/64; 528/65; 528/68; 528/76; 528/77; 528/78
[58] Field of Search ........................ 528/59, 60, 61, 64, 528/65, 68, 76, 77, 78

[56] References Cited

U.S. PATENT DOCUMENTS 4,916,201  4/1990  Harris et al. ........................ 528/60
4,959,499  9/1990  Harris ............................... 528/196

Primary Examiner—John Kight, III
Assistant Examiner—Duc Truong

[57] ABSTRACT

Described herein are modified polyahls comprising (a) a backbone portion containing at least one polyalkyleneoxy moiety and one or more internal urea, amide, biuret, thiourea, dithiobiuret, or thioamide moieties, (b) end groups selected from the group consisting of amino, hydroxy amide or hydroxyester amide, wherein at least one end group is hydroxy amide or hydroxyester amide, wherein each internal moiety is separated from each other and from each end group by at lit least one alkylene, cycloalkylene, aralkylene, arylene, or alkyleneoxy moiety with 4–20 carbon atoms, or at least one polyalkyleneoxy moiety containing from 2–50 alkyleneoxy units. Also described are urethane/urea prepolymers and polymers prepared therefrom.

20 Claims, No Drawings

HYDROXY-FUNCTIONAL POLYETHERS CONTAINING UREA, BIURET, THIOUREA, DITHIOBIURET, THIOAMIDE, AND/OR AMIDE MOIETIES IN THEIR BACKBONE AND URETHANE/UREA PREPOLYMERS AND POLYMERS MADE THEREFROM

CROSS-REFERENCE TO RELATED APPLICATION

This application is a continuation-in-part of Ser. No. 485,678, filed Feb. 27, 1990, now U.S. Pat. No. 5,055,544, which is a continuation-in-part of Ser. No. 247,460, filed Sept. 21, 1988, now U.S. Pat. No. 4,916,201, which is a continuation-in-part of Ser. No. 099,027, filed Sept. 21, 1987, now abandoned, and is related to the following copending applications: Ser. No. 831,761, filed Feb. 21, 1986; Ser. No. 926,692, filed Nov. 4, 1986; Ser. No. 000,227, filed Jan. 2, 1987; Ser. No. 254,503, filed Oct. 6, 1988; and Ser. No. 310,107, filed Feb. 10, 1989.

BACKGROUND OF THE INVENTION

This invention relates to modified polyamines having backbones containing (1) polyether moieties and (2) urea, thiourea, amide, thioamide, dithiobiuret, and/or biuret moieties and to urethane/urea prepolymers and polymers thereof. These modified polyamines are useful as starting materials for the fabrication of urea/urethane polymers such as foams, elastomers, plastics, coatings and adhesives, and are also useful in the fabrication of epoxy resins.

In general it is known to prepare polyurethanes containing urea moieties by the reaction of a polyol and water with an isocyanate and a chain extender as disclosed in Sweeney, *Reaction Injection Molding Machinery and Processes* (1987). Many other types of polymers and oligomers containing urea moieties in their backbone are known materials which can be prepared in a variety of ways. The majority of such materials are prepared by the reaction of an isocyanate with an amine. The resulting products can range from simple monomers as disclosed in U.S. Pat. Nos. 3,294,749, 3,386,955, and 3,386,956, to oligomers as disclosed in U.S. Pat. Nos. 3,248,424 and 4,332,953, to soluble polymers as disclosed in U.S. Pat. No. 3,639,338, to dispersions in polyols as disclosed in German Patent 3,125,402. It is generally known that the introduction of urea moieties into a polyurea/urethane polymer improves the high temperature mechanical properties of the polymer.

Compounds or polymers containing trifunctional biuret moieties are generally produced by the reaction of a polyisocyanate with water. In such a reaction, a small number of isocyanate moieties are hydrolyzed to amino moieties by reaction with water. These amino moieties, in the presence of larger quantities of isocyanate moieties, react to form polyisocyanates containing urea moieties. Further reaction of the urea moieties with additional polyisocyanates produces polyisocyanates containing biuret moieties. These biuret-containing isocyanates have been known for many years and have been used in a variety of applications, for example as shown in U.S. Pat. Nos. 4,028,313; 4,203,875; 4,284,544; 4,289,813; 4,305,977; 4,388,245; and 4,449,591. It is generally recognized that the inclusion of trifunctional biuret moieties into a polyurea/urethane polymer produces a material having increased crosslink density.

Polyamides of polycarboxylic acids and poly(alkyleneoxy)polyamines are well-known compositions. Polyurethane coating compositions based on the reaction products of poly(propyleneoxy)polyamines with isocyanate-polyol prepolymers blocked with lactams are disclosed in Jpn 59/226062 (1984). Polyether polyols containing amide groups produced from partially animated polyether polyols and adipoyl chloride or terephthaloyl chloride by reactions with isocyanates to produce urethane polymers are disclosed in DE 2,559,372 (1977).

It is also known to prepare isocyanate-functional prepolymers having urea moieties or biuret moieties or combinations thereof. Such isocyanate-functional prepolymers are prepared by first reacting a polyhydroxyl compound such as a polyether polyol with excess isocyanate. The resulting isocyanate-functional prepolymer is then chain-extended with reactions with polyamine or amino alcohols to produce polymers containing urethane and urea moieties in their backbones, such as shown in U.S. Pat. Nos. 3,471,449; 3,583,937; 3,627,714; 3,668,173 and 3,936,409. In some instances, the polymers contain only urea moieties in their backbones. In other cases, the polymers contain both urea and biuret moieties in their backbones. It is also known to react an isocyanate-functional prepolymer with a monofunctional amine to give polymers or oligomers which contain urea moieties near the end of the molecule as shown in U.S. Pat. No. 4,522,986.

In the polyurethanes and polyureas of the prior art containing urea and/or biuret moieties, the urea and/or biuret moieties are found to reside only in the hard segment of the resulting polyurethane or polyurea. Such polyureas/urethanes are observed to exhibit properties such as modulus, strength, hardness, toughness and solvent resistance which are less than are desired for many applications.

In view of such deficiencies of such prior art materials, it would be highly desirable to provide a polyurethane or polyurea having the desirable properties contributed by having urea, thiourea, dithiobiuret and/or biuret moieties without sacrificing significantly the properties of modulus, strength, hardness, toughness and solvent resistance.

SUMMARY OF THE INVENTION

In one aspect, this invention is a modified polyahl comprising
(a) a backbone portion containing at least one polyalkyleneoxy moiety and one or more internal urea, amide, biuret, thiourea, dithiobiuret, or thioamide moieties,
(b) end groups selected from the group consisting of amino, hydroxy amide or hydroxyester amide, wherein at least one end group is hydroxy amide or hydroxyester amide,
wherein each internal urea, amide, biuret, thiourea, dithiobiuret, or thioamide moiety is separated from each other and from each end group by at least one alkylene, cycloalkylene, aralkylene, arylene, or alkyleneoxy moiety with 4-20 carbon atoms, or at least one polyalkyleneoxy moiety containing from 2-50 alkyleneoxy units. These polyahls are useful as starting materials for the fabrication of urea/urethane polymers such as foams, elastomers, plastics, coatings and adhesives, and are also useful in the fabrication of epoxy resins.

In a second aspect, this invention is an isocyanate-functional prepolymer comprising the reaction product of one or more of the modified polyahls above with at least one organic polyisocyanate such that the reaction product has at least one terminal isocyanate moiety.

In a third aspect, this invention is a polymer formed by the reaction of the aforementioned isocyanate-functional prepolymer with at least one active hydrogen-containing compound.

In a fourth aspect, this invention is a urethane/urea polymer formed by the reaction of one or more modified polyahls which are the first aspect of this invention with at least one organic polyisocyanate. In this fourth aspect, it is optional and often preferred to employ, in addition to the aforementioned modified polyahl, one or more other active hydrogen-containing compounds in the reaction to form the urethane/urea polymer.

The resulting urethane/urea polymers of this invention have superior properties such as higher modulus, greater strength, increased hardness and toughness and superior solvent resistance when compared to similar polymers which do not contain either urea, biuret, thiourea, dithiobiuret, thioamide, or amide moieties, and polyalkyleneoxy moieties. The increased modulus observed for the polymers of this invention prepared from aliphatic polyamines enable the manufacture of plastic parts having superior stiffness at lower hard segment contents which results in less cost than conventional polyurethane/urea polymers. The polymers of this invention also exhibit superior green strength on demold when fabricated in reaction injection molding equipment. This superior green strength allows the use of lower mold temperatures which results in economic and handling advantages. In many cases, the urethane/urea polymers of this invention cure faster than conventional urethane/urea polymers. This results in the economic advantage of reduced cure schedules.

DETAILED DESCRIPTION OF ILLUSTRATIVE EMBODIMENTS

The modified polyahls of the invention may be prepared by contacting a cyclic lactone with a modified polyamine comprising a backbone portion containing at least one polyalkyleneoxy moiety and one or more internal urea, amide, biuret, thiourea, dithiobiuret, or thioamide moieties, and a plurality of primary amino groups wherein each amino group is separated from each urea, amide, biuret, thiourea, dithiobiuret, or thioamide moiety by at least one alkylene, cycloalkylene, aralkylene, arylene, or alkyleneoxy moiety with 4-20 carbon atoms, or at least one polyalkyleneoxy moiety containing from 2-50 alkyleneoxy units (hereafter, "modified polyamine"), under reaction conditions sufficient to form a modified polyahl comprising (a) a backbone portion containing at least one polyalkyleneoxy moiety and one or more internal urea, amide, biuret, thiourea, dithiobiuret, or thioamide moieties, (b) at least one terminal hydroxy amide or hydroxyester amide group, wherein each internal urea, amide, biuret, thiourea, dithiobiuret, or thioamide moiety is separated from each other and from each terminal group by at least one alkylene, cycloalkylene, aralkylene, arylene, or alkyleneoxy moiety with 4-20 carbon atoms, or at least one polyalkyleneoxy moiety containing from 2-50 alkyleneoxy units. The term "polyahl", as used herein, refers to an active hydrogen-containing compound, as further defined hereafter.

Preferably, this cyclic lactone is caprolactone or butyrolactone. These active hydrogen-containing compounds which contain at least one hydroxyl end group may be contacted with isocyanates under reaction conditions sufficient to form prepolymers or polymers, optionally in the presence of additional active hydrogen-containing compounds.

When the modified polyamines are diamines, they are generally represented by the formula:

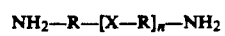

wherein each R is independently in each occurrence an alkylene, cycloalkylene, aralkylene, aryl, alkyleneoxy, or polyalkyleneoxy moiety, wherein at least one R is polyalkyleneoxy; X is independently in each occurrence an acyclic moiety selected from the group consisting of urea, biuret, thiourea, dithiobiuret, amide, and thioamide; when a urea moiety X is

when a biuret moiety X is

when a thiourea moiety X is

when a dithiobiuret moiety X is

when an amide moiety X is

where R' is alkylene, cycloalkylene, aralkylene, arylene, and when a thioamide moiety X is

and n is an integer between 1 and 50, and preferably between 2 and 50. Corresponding structures can be used when the modified polyamines are triamines and higher polyamines.

The modified polyamines are prepared by contacting a polyalkyleneoxy polyamine with urea, thiourea, biuret, dithiobiuret, a polycarboxylic acid, polycarboxylic acid ester, polycarboxylic acid halide, or a polythiocarboxylic acid, polythiocarboxylic acid ester, polythiocarboxylic acid halide or a combination thereof, optionally in the presence of a $C_{4-20}$ alkylene-, cycloalkylene-, aralkylene-, or arylene polyamine.

The polyalkyleneoxy polyamines used in preparing the modified polyamines are well-known compositions which are conventionally prepared by the reductive amination of polyether polyols using hydrogen and ammonia in the presence of catalyst. This reductive amination of polyols is described in U.S. Pat. Nos. 3,128,311; 3,152,998; 3,236,895; 3,347,926; 3,654,370; 4,014,933 and 4,153,581, the relevant portions of which are hereby incorporated by reference.

Polyalkyleneoxy polyamines having 3-aminopropoxy end groups are also well-known compositions which can be used in preparing the modified polyamines of this invention. Such polyamines can be obtained by the cyanoethylation of polyamines with acrylonitrile followed by hydrogenation to the corresponding polyamines. The synthesis of materials of this type is described in Rylander, *Catalytic Hydrogenation in Organic Synthesis* (1979) and in U.S. Pat. Nos. 3,471,563; 3,880,928; 3,880,929; 3,896,174, the relevant portions of which are hereby incorporated by reference.

Optionally, other polyamines can be used in addition to the polyalkyleneoxy polyamines. These polyamines can be aliphatic, cycloaliphatic, aromatic, alkylene aromatic, araliphatic, or heterocyclic. Preferably, the amino moieties in such polyamines are sufficiently spaced apart to prevent the formation of cyclic urea moieties if the polyamine is reacted with urea. Preferably, the polyamine has a molecular weight of at least about 60, more preferably at least about 70, and most preferably at least about 80; and is preferably no greater than about 3000, more preferably no greater than about 2000, and most preferably no greater than about 1500.

Specific examples of suitable additional polyamines include butylenediamine, pentylenediamine, 2-methyl-1,5-pentanediamine, hexamethylenediamine, dodecamethylenediamine, trimethyldiaminohexane, 2,2'-bisaminopropylmethylamine, diethylenetriamine, triethylenetetraamine, and tetraethylenepentamine, dipropylenetriamine, piperazine, N,N'-bis-aminoethylpiperazine, triazine, 4-aminobenzylamine, 4-aminophenylethylamine, 1,4-diaminocyclohexane, phenylenediamines, naphthylenediamines, condensates of aniline and formaldehyde such as methylenediphenylamine, toluenediamine, bisaminomethyl benzenes and the derivatives of the above-mentioned aromatic amines including butylenediamine, hexamethylenediamine, dodecamethylenediamine, methylenediphenylamine, and toluenediamine. Especially preferred are butylenediamine, hexamethylenediamine, methylenediphenylamine and toluenediamine. If $C_{4-12}$ aliphatic amines are used, they may contain minor quantities of $C_{2-3}$ amines, but these are preferably absent as they may form cyclic urea moieties when reacted with urea.

The modified polyamines of this invention which contain internal biuret or thiobiuret moieties in their backbones can be prepared from the reaction of biuret or dithiobiuret with a polyamine. Biuret is an item of commerce having the formula:

II

Dithiobiuret is a well-known compound having the formula:

III

It can be made, for example, by the action of hydrogen sulfide on $NH_2C(=NH)NHCN$ (as disclosed in U.S. Pat. No. 2,371,112 and French Patent 2,004,212).

In the preparation of the modified polyamines containing one or more biuret or dithiobiuret moieties in their backbones, one or more polyalkyleneoxy polyamines are contacted with biuret or dithiobiuret, optionally in the presence of $C_{4-20}$ alkylene, cycloalkylene, aralkylene, or arylene polyamines, depending on which product is desired, under conditions sufficient to produce a corresponding biuret- or dithiobiuret-modified polyamine. Preferably, such reactions are carried out at temperatures in the range from about 100° C. to 200° C., more preferably from 110° C. to 175° C. and most preferably from 125° C. to about 160° C. The time of the reaction, while dependent upon the temperature used, is preferably in the range from 1 to 48 hours, most preferably from about 2 to 8 hours when the reaction temperature is about 150° C. and from about 5 to 24 hours when the reaction temperature is about 125° C.

Several types of modified polyamiines useful in making the modified polyahls of the invention which contain urea moieties are known compositions which can be prepared by a variety of techniques. For example, in one method, a polyether polyamine as described hereinbefore can be reacted with urea under the conditions described in U.S. Pat. Nos. 4,002,598; 4,115,360; 4,116,938; and 4,178,427. Alternatively, such polyamines containing a limited amount of urea moieties in their backbones are prepared by the reaction of the polyamine polyethers with diphenyl carbonate with the corresponding removal of phenol under conditions as described in U.S. Pat. Nos. 4,002,598; 4,115,360; and 4,178,427. The foregoing references also describe a third process for preparing such polyamines containing a limited amount of urea moieties by reacting a polyether polyamine with phosgene. Of the foregoing techniques, it is generally desirable to employ the reaction of the polyether polyamine with urea to provide the desired urea-containing polyamine. However, these urea polyamines of the prior art, which have an average of less than two internal urea moieties per molecule and low molecular weight, have been found to offer substantially less improvement in the physical properties of polyurethanes and polyureas prepared from them.

Several types of modified polyamines useful in making the modified polyahls of the invention which contain internal amide moieties are known compositions which can be prepared by a variety of techniques. For example, in one method, an excess of a polyether polyamine as described hereinbefore can be reacted with polyacids under conditions whereby the acid moieties on the polyacid react with the amino moieties in the polyether polyamine to form amide linkages and the excess amino moieties in the polyether polyamine represent amino end groups. Examples of this process can be found in Jpn 51/125429, Jpn 51/75737, and U.S. Pat. No. 4,082,708. In another process for making polyether polyamines with amide moieties in their backbone, esters of polycarboxylic acids and/or anhydrides can be used in place of, or in addition to, the polycarboxylic acids used above. Examples can be found in DE 2,552,455; DE 2,552,518; DE 2,814,566; and U.S. Pat. Nos. 4,128,525 and 4,119,615. Epoxy resins can be included, such as in U.S. Pat. No. 4,133,803. Caprolactam can be included in the reactions of polyether polyamines with polyacids as taught in DE 3,006,961. Acid chlorides or acid esters can be used in place of acids to produce the internal amide moieties. Acid chlorides can be used in place of acids such as in DE 2,559,372. The relevant portions of references identified in this paragraph are incorporated by reference.

The modified polyamines which contain internal thioamide moieties in their backbone can be prepared from the reaction of an excess of a polyamine as described hereinbefore with polythioacids under conditions whereby the acid moieties of the polythioacid react with the amino moieties in the polyether polyamine to form thioamide linkages and the excess amino moieties in the polyether polyamine remain as amino end groups. Thioacid chlorides or thioesters can be used in place of thioacids to produce the internal thioamide moieties.

The modified polyamines which contain internal thiourea moieties in their backbones can be prepared from the reaction of thiourea with polyalkyleneoxy polyamines, optionally in the presence of $C_{4-20}$ alkylene, cycloalkylene, aralkylene, arylene, or alkyleneoxy polyamines. Thiourea is an item of commerce having the formula:

    IV

In the preparation of the modified polyamines containing one or more thiourea moieties in their backbones, one or more of the above-named polyamines are contacted with thiourea under conditions sufficient to produce the desired product. Preferably, such reactions are carried out at temperatures in the range from about 100° C. to 200° C., more preferably from 125° C. to 200° C. and most preferably from 150° C. to 175° C. The time of the reaction, while dependent upon the temperature used, is preferably in the range from about 3 to 48 hours, most preferably from 12 to 24 hours when the reaction temperature is about 175° C.

Modified polyamines containing at least two different moieties selected from the group consisting of urea, biuret, thiourea, dithiobiuret, thioamide, and amide may also be used to prepare the modified polyahls of this invention. Some of these modified polyamines can be prepared by the reaction of a polyether polyamine with a mixture of biuret and urea under the conditions described hereinabove. Alternatively, such modified polyamines containing both urea and biuret moieties can be prepared by first reacting a polyether polyamine with urea to form a modified polyamine containing urea moieties in its backbone and then reacting that product with biuret to form a modified polyamine containing both urea and biuret moieties in its backbone. Either the reaction with urea or biuret can be carried out first. This stepwise process is preferred since the optimum conditions for each reaction are slightly different. Processes for the preparation of modified polyamines containing at least two different moieties selected from the group consisting of urea, biuret, thiourea, dithiobiuret, thioamide, and amide are fully described in U.S. Ser. No. 485,678, filed Feb. 27, 1990, which is hereby incorporated by reference it its entirety.

The stoichiometry of the reactants used to prepare the modified polyamines containing urea, amide thiourea, biuret thioamide and/or dithiobiuret moieties can vary depending upon the number of internal urea, amide, thiourea, biuret, thioamide and/or dithiobiuret moieties desired in the average backbone molecule. For example, in the case of the reaction of a diamine with a biuret, a molar ratio of two diamines per one biuret will give a product which contains about one biuret moiety per average polyamine molecule. In contrast, a diamine:biuret mole ratio of 1.3:1 will give a modified polyamine product which contains about four biuret moieties per average molecule. In the case of urea-containing polyamines, a molar ratio of two diamine units to one urea unit will give a modified polyamine product which contains about 1 urea moiety per average product molecule. A diamine:urea ratio of 1.3:1 will give a product which contains about 4 urea moieties per average polyamine molecule.

Although it is possible to prepare modified polyamines containing urea, thiourea, biuret and/or dithiobiuret moieties in their backbones in solvents, it is generally preferred to prepare them in a neat condition. However, when solvents are used, they are generally inert organic solvents which are more volatile than the resulting product. Examples of such solvents include alcohols, ethers, amides, sulfoxides, and certain hydrocarbons such as anisole, phenyl ethyl ether, cumene, hexanol, dodecanol, dimethyl acetamide and dimethyl sulfoxide. Following the reaction, the solvents can be vaporized. Reduced pressures can be used to increase reaction rate by facilitated ammonia removal. This technique can be applied toward the final stages of reaction to increase conversion.

For the preparation of any of the aforementioned modified polyamines, it is generally unnecessary to purify the product to any significant degree. Usually small amounts of unreacted biuret can be removed by filtration if necessary. If a solvent is employed it can be removed by fractional distillation. Residual ammonia can be removed by heating under reduced pressure. When an amide or thioamide is made by the reaction of a polyether polyamine with a polycarboxylic acid or polythiocarboxylic acid, water is the by-product of the reaction. It is preferred to include a small amount of solvent in the reaction mixture which can remove the water by azeotropic distillation. Toluene, xylene and cumene are convenient solvents. They can be removed by fractional distillation after the reaction is complete. Alternatively, the reaction can be run neat under reduced pressure whereby the water is volatilized from the reaction mixture as it is formed.

In the aforementioned modified polyamines, the end group functionality of the product is controlled by the functionality of the polyether polyamine and/or optional other polyamines employed. If a difunctional modified polyamine is desired, a polyether diamine is used to synthesize the product. If higher functionality is desired, then a blend of a polyether diamine and a polyether polyamine and/or optional other polyamines with a functionality of three or higher can be used. For even higher functionality, only polyethylene polyamines and/or optional other polyamines with functionalities of three or higher can be employed. When amide and/or thioamide moieties are employed, functionality of the polyacid and/or polythioacid also controls the functionality of the product. The same is true when acid halides or acid esters are used.

The particular polyether polyamine selected to prepare the modified polyamine-containing urea, biuret, thiourea, dithiobiuret, thioamide, amide, or mixture thereof is dependent upon the required properties of the final product. For example, a polyethyleneoxy polyamine will be used to add hydrophilic characteristics to the product whereas polymers of higher alkyleneoxy polyamines such as polypropyleneoxy, polybutyleneoxy and the like, will be employed to add hydrophobic character to the resultant product. It is understood that even greater hydrophobic characteristics can be imparted by the use of higher alkyl-containing materials such as epoxides of 1-octene, 1-decene, 1-dodecene, 1-hexadecene, and 1-octadecene. Also suitable as starting materials for preparing polyether polyamines are glycidyl ethers of alcohols such as hexanol, octanol, decanol, dodecanol, tetradecanol, hexadecanol and octadecanol.

The properties of the resulting urethane polymers can be significantly modified by the selection of the polyether moieties of the polyamines. For example, polyethyleneoxy moieties are useful when the polyurethanes require antistatic properties. Polypropyleneoxy and higher alkyleneoxy polymers are useful in polymers requiring resistance to hydrolysis. Combinations of ethyleneoxy and higher alkyleneoxy polymers are desirable in instances wherein a balance of properties are required.

The modified polyamines range from viscous liquids to low melting solids depending upon the molecular weight of the polyamine and the composition of the polyether polyamines used in their preparation. Preferably, the number average molecular weight of such modified polyamines containing one or more of the following moieties: urea, biuret, thiourea, dithiobiuret, thioamide, or amide, is within the range from about 400 to 100,000 or more, most preferably from about 600 to about 40,000. Preferably, the number average molecular weight of such modified polyamines containing two or more urea moieties is within the range from about 2,000 to 100,000, most preferably from about 3,000 to about 20,000.

The modified polyamines containing one or more of the following internal moieties: urea, biuret, thiourea, dithiobiuret, thioamide, or amide, have a controllable spacing between these moieties. The molecular weight and molecular weight distribution of the polyether polyamine starting material will carry over into the modified polyamine product and thereby determine the spacing of the urea, biuret, thiourea, and dithiobiuret moieties. The spacing between amide or thioamide moieties depends on the length of the polyacids from which they are prepared. For example, if a polyether diamine of 400 molecular weight is used as the reactant, then the modified polyamine product will have approximately a 400 molecular weight polyether spacing between each internal urea and/or biuret moiety. If a polyether diamine of approximately 400 molecular weight is used as reactant with adipic acid, then the modified polyamine product will have approximately a 400 molecular weight spacing and a 56 molecular weight spacing alternating between successive amide groups.

The modified polyahls containing at least on acyclic moiety selected from the group consisting of urea, amide, thiourea, biuret, dithiobiuret, amide, and thioamide may be prepared by the reaction of modified polyamines with cyclic lactones. As the molar ratio of cyclic lactone:polyamine is increased, a series of products can be produced. At lower molar ratios, active hydrogen-containing compounds which contain both amino and hydroxy amide end groups can be produced. A second class of products which may be produced at higher molar ratios contains only hydroxy amide end groups. A third class of products may be produced at even higher molar ratios in which hydroxy amide end groups react further with cyclic lactones to form hydroxyester amide linkages and a higher molecular weight hydroxyl functional product.

The hydroxy amide end groups may be represented by the following formula:

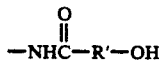

wherein R' is a C3-12 alkyl group which may be inertly substituted.

The hydroxyester amide end groups may be represented by the following formula:

wherein R' is defined above.

Preferred cyclic lactones are caprolactone and butyrolactone. While the modified polyamine and the cyclic lactone may be reacted at any temperature and pressure which will allow the reaction to proceed, most preferred reaction temperature is about 180° C. for caprolactone and about 125° C. for butyrolactone. The conversion of primary amino end groups to hydroxyl end groups is a way of controlling end group activity. The lower reactivity of hydroxyl end groups toward polyisocyanates allows for the use of these materials in applications such as cast elastomers and flexible foams, where lower reaction rates are required.

The isocyanate-functional prepolymer compositions of this invention are formed by the reaction of a modified polyahl containing one or more of the following moieties: biuret, urea, thiourea, dithiobiuret, thioamide, or amide, with excess polyisocyanate.

The polyisocyanates suitable for making the prepolymers of this invention include aliphatic, cycloaliphatic, araliphatic, aromatic and heterocyclic polyisocyanates. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane (see e.g., German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4"-triisocyanate, polyphenyl polymethylene polyisocyanates of the type obtained by condensing aniline with formaldehyde, followed by phosgenation and such as described for example in British Patents 874,430 and 848,671, perchlorinated aryl polyisocyanates of the type described in German Auslegeschrift 1,157,601, polyisocyanates containing carbodiimide groups of the type described in German Patent 1,092,007, diisocyanates of the type described in U.S. Pat. No. 3,492,330, polyisocyanates containing allophanate groups of the type described, for example, in British Patent 994,890, in Belgian Patent 761,626 and in published Dutch Patent Application No. 7,102,524, polyisocyanates containing isocyanurate groups of the type described in German Patents 1,022,789; 1,222,067 and 1,027,394 and in German Offenlegungsschrift 1,929,034 and 2,004,048, polyisocyanates containing urethane groups of the type described, for example, in Belgian Patent 752,261 or in U.S. Pat. No. 3,394,164, polyisocyanates containing acrylated urea groups as described in German Patent 1,230,778, polyisocyanates containing biuret groups of the type described, for example, in German Patent 1,101,392, in British Patent 889,050 and in French Patent 7,017,514, polyisocyanates obtained by telomerization reactions of the type described, for example, in Belgian Patent 723,640, polyisocyanates containing ester groups of the type described, for example, in British Patents 965,474 and 1,072,956, in U.S. Pat. No. 3,567,763 and in German Patent 1,231,688 and reaction products of the aforementioned isocyanates with acetals as described in German Patent 1,072,385.

In addition, derivatives of 4,4'-diphenylmethane diisocyanate which are liquid at room temperature such as, for example, polyisocyanates which have carbodiimide groups in their backbone or mixtures thereof may also be used. The preparation of these materials is disclosed in U.S. Pat. No. 3,152,162, which is hereby incorporated by reference in its entirety. An example of a commercial material of this type is Isonate TM 143L and Isonate TM 143LM Isocyanates, products of The Dow Chemical Company.

It is also possible to use the distillation residues containing isocyanate groups accumulating in the commercial production of isocyanates, optionally in solution in one or more of the aforementioned polyisocyanates. In addition, it is possible to use mixtures of the aforementioned polyisocyanates.

Additional polyisocyanates suitable for use in this invention include those described by W. Siefken in *Justus Liebigs Annalen der Chemle*, 562, pp. 75-136, and in U.S. Pat. Nos. 3,284,479; 4,089,835; 4,093,569; 4,221,876; 4,310,448; 4,359,550 and 4,495,309.

One class of particularly useful polyisocyanates are the aromatic polyisocyanates such as 2,4- and 2,6-tolylene diisocyanates and mixtures of these isomers ("TDI"), polyphenyl-polymethylene polyisocyanates Of the type obtained by condensing aniline with formaldehyde, followed by phosgenation ("crude MDI") and, polyisocyanates containing carbodiimide groups, urethane groups, allophanate groups, isocyanurate groups, urea groups or biuret groups ("modified polyisocyanates").

A preferred class of aromatic polyisocyanates is methylene bis(4-phenylisocyanate) or MDI, including pure MDI, quasi- and prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine-modified pure MDI is included also. This product is made by heating pure distilled MDI in the presence of a catalyst.

In the preparation of such prepolymers, excess isocyanate can be added to the modified polyamine or the modified polyamine can be added to excess isocyanate. Preferably, the modified polyamine is added to excess isocyanate under conditions which are well-known for the reaction of polyisocyanates with prior art active hydrogen-containing compounds. Examples of such conditions are described in U.S. Pat. Nos. 4,108,842; 4,125,522 and 4,476,292, the relevant portions of which are hereby incorporated by reference.

The viscosity of the modified polyahl increases with increasing number of urea, thiourea, biuret, dithiobiuret, thioamide and/or amide moieties in the polyamine backbone and with increasing molecular weight of the polyamine. This increased viscosity in the modified polyahl results in increased viscosity in the corresponding isocyanate functional prepolymer. This requires corresponding increases in the reaction temperature during prepolymer formation. Temperatures of 800° C. to 110° C. or even higher are required as the modified polyamine and/or prepolymer viscosity increases. At the higher temperatures, prepolymer stability is sometimes reduced and chain extension of the prepolymer to the corresponding polymer needs to be carried out more quickly. The presence of mildly acidic prepolymer stabilizers, such as benzoyl chloride, can be useful. In some cases an inert solvent, such as dimethylsulfoxide, dimethylformamide or dimethylacetamide, is used to reduce the viscosity of the modified polyamine and the corresponding prepolymer. A chain extender can be added to the prepolymer solution and the resultant polymer separated. When the polymer is soluble it can be cast as a film from solution or it can be precipitated by the addition of a poor solvent or it can be obtained by removal of the solvent.

It is further understood that such prepolymers of this invention may also be prepared by the reaction of the modified polyahl and an active hydrogen-containing compound as a mixture with excess polyisocyanate. This is another way to reduce the viscosity of the prepolymer and thereby facilitate its handling. In such prepolymers, the modified polyahl:active hydrogen-containing compound mole ratio is in the range from about 20:1 to about 0.05:1, most preferably from about 10:1 to about 0.1:1. These prepolymers are also isocyanate-functional and are prepared using conditions known in the prior art as cited hereinbefore.

In a third aspect, this invention is a novel urethane and/or urea polymer formed by the reactions of the aforementioned isocyanate-functional prepolymer of this invention with an active hydrogen-containing compound or mixtures of active hydrogen-containing compounds. An active hydrogen-containing compound is a compound having a plurality of active hydrogen moieties that are reactive with the Zerewitinoff reagent according to a test described by Kohler in 49 *Jour. of the Amer. Chem. Soc.* 3181 (1927). Examples of such moieties include mereaptan, hydroxyl, primary and secondary amine, and acid groups. Such compounds are also known as "polyahls". Many such active hydrogen-containing compounds of a lower molecular weight are commonly called chain-extenders when used with isocyanate-functional prepolymers and are optionally employed with catalysts and a variety of other additives. High molecular weight active hydrogen-containing compounds can also be used.

The chain-extenders useful to make the polymers of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Other chain-extenders including cyclic diols such as 1,4-cyclohexanediol and 1,4-cyclohexanedimethanol; aromatic ring-containing diols such as bishydroxyethylhydroquinone; amide- or ester-containing diols or amino alcohols are useful. Aromatic diamines and aliphatic diamines are suitable chain-extenders. Examples include ethylenediamines, 1-(2-aminoisopropyl-4-methyl-4-aminocyclohexane), 1,2-propanediamine, 1,4-butanediamine; 1,6-hexanediamine, diethyltoluenediamine and 1,4-bis-(aminomethyl)cyclohexane. Additional examples of useful chain-extenders can be found in U.S. Pat. Nos. 4,297,444; 4,202,957; 4,476,292; 4,495,309 and 4,218,543.

Catalysts such as tertiary amines or an organic tin compound or other polyurethane catalysts may be used. The organic tin compound may suitably be a stannous or stannic compound, such as stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 18 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used. Other catalysts include organo zinc, mercury and lead compounds. For some polymers, a catalyst is not needed.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethyl ether, etc.), 1,4-dimethylpiperazine, triethylenediamine, etc., and aliphatic polyamines, such as N,N,N',N'-tetramethyl-1,3-butanediamine.

Optional additives include anti-foaming agents such as glycerine, an ethyl acrylate-2-ethylhexyl acrylate copolymer, dimethyl siloxane copolymers and silicones; antioxidants such as esters of β-(3,5-di-tertbutyl-4-hydroxyphenyl) propionic acid with monohydric or polyhydric alcohols, for example, methanol, octadecanol, 1,6-hexanediol, neopentyl glycol, thiodiethylene glycol, diethylene glycol, triethylene glycol, pentaerythritol, tris-hydroxyethyl isocyanurate, and dihycic) droxyethyl oxalic acid diamine; UV absorbers and light stabilizers such as 2-(2'-hydroxyphenyl)benzotriazoles and sterically hindered amines such as bis-(2,2,6,6-tetramethylpiperidyl-sebacate, bis-(1,2,2,6,6-pentamethylpiperidyl)-sebacate, n-butyl-3,5-di-tert-butyl-4-hydroxybenzyl malonic acid, bis-(2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylene diamine and 4-tertoctylamino-2,6-dichloro-1,3,5-s-triazine, tris(2,2,6,6-tetramethylpiperidyl)-nitrilotriacetate, tetrakis-(2,2,6,6-tetramethyl-4-piperidyl)-1,2,3,4-butane-tetracarbonic acid and 1,1'-(1,2-ethanediyl)-bis-(3,3,5,5-tetramethylpiperazinone); plasticizers such as phthalates, adipates, glutarates, epoxidized vegetable oils, and the like; fungicides; pigments; dyes; reactive dyes; moisture scavengers; and the like. In addition, fillers and reinforcing materials such as chopped or milled glass fibers, chopped or milled carbon fibers and/or other mineral fibers are useful.

Approximately stoichiometric amounts of the isocyanate moieties of the isocyanate-functional prepolymers of this invention and the active hydrogen moieties on the active hydrogen-containing compounds are used. The equivalent ratio of isocyanate moieties to total active hydrogen moieties is between about 0.95:1.00 to 1.00:1.05, more preferred is an isocyanate:active hydrogen-containing compound equivalent ratio of from 0.97:1.00 to 1.00:1.03, most preferred is a ratio of 1.00:1.00 to 1.00:1.03.

In a fourth aspect, this invention is a novel urethane/urea polymer formed by the reaction of the modified polyahl with a polyisocyanate as defined hereinbefore. Such urethane/urea polymers are optionally prepared in the presence of other active hydrogen-containing compounds as defined hereinbefore and catalysts and other additives used conventionally to prepare urethane and urea polymers. For some polymers a catalyst is not needed.

Approximately stoichiometric amounts of the isocyanate moieties of the polyisocyanates and the total active hydrogen moieties on the modified polyahl and other active hydrogen-containing compounds, if employed, are used. The equivalent ratio of isocyanate moieties to total active hydrogen moieties is between about 0.90:1.00 to 1.00:1.25; more preferred is an isocyanate-:active hydrogen equivalent ratio of from 0.95:1.00 to 1.00:1.15, most preferred is a ratio of 0.98:1.00 to 1.00:1.05. The preparation of urethane/urea polymers is well-known in the art. Examples of typical reaction conditions employed can be found in U.S. Pat. Nos. 4,460,715 and 4,394,491, the relevant portions of which are hereby incorporated by reference.

The urethane/urea polymers of the present invention can be fabricated by any fabrication technique known in the art. Useful processes include hand casting (see, for example, U.S. Pat. No. 4,476,292) and reaction injection molding (see, for example, U.S. Pat. Nos. 4,297,444 and 4,495,309).

Reaction injection molding (RIM) is a preferred fabrication technique. The relatively high viscosities of the modified polyahls are readily reduced by heating. This is easily accomplished in RIM equipment by heating the tank and lines. Viscosity is also reduced by blending with chain-extending agents and, optionally, with other active hydrogen-containing compounds. The urethane/urea polymers of this invention are useful in automotive body panel applications or automotive facsia.

Preferably, the urethane/urea polymer is post-cured by heating the urethane/urea polymer that forms the sixth or seventh aspect of this invention to a temperature in the range from about 175° C. to about 200° C. for a period from about 1 to about 12 hours or more. To prevent degradation, it is preferred to carry out the post-curing process in an inert atmosphere, such as nitrogen, when using higher temperatures or longer heating periods. As a result of this post-cure, the properties such as modulus and tensile strength of the resultant polymer are advantageously improved.

ILLUSTRATIVE EMBODIMENTS

The following examples are given to illustrate the invention and should not be interpreted as limiting it in any way. Unless stated otherwise, all parts and percentages are given by weight.

EXAMPLE 1

Reaction Product of Diamine Containing Four Urea Moieties in its Backbone with ε-Caprolactone; ε-Caprolactone:Diamine Molar Ratio=2:1

A diamine containing four urea moieties per average backbone molecule is prepared by reacting Jeffamine ™ D-400 (an aminated poly(propylene glycol) of approximately 400 molecular weight manufactured by Texaco) with urea using a 1.20:1 molar ratio of Jeffamine ™ TI D-400:urea. This diamine (188.3 9; 0.0750 mol; MW=2510 ) and $\epsilon$-caprolactone (17.23 g; 0.150 mol) are combined in a 500 ml reactor equipped with an overhead stirrer, thermometer, condenser, temperature controller and maintained under a nitrogen atmosphere. The reactor is heated at 180° C. for 5 hours. The product is obtained as a viscous liquid: Brookfield viscosity, 242,000 cps at 22° C.; 0.2778 meg amine/g by titration with 0.1 HClO$_4$; 61.9 percent amine conversion; calculated average molecular weight is 2738 by end group titration. Carbon-13 NMR (DMSO-d$_6$) shows amide carbonyl moieties, ester carbonyl moieties, and urea moieties.

This example shows the preparation of a product which contains internal urea moieties in its backbone. A substantial amount of amino end groups are still present. Hydroxyl end groups linked by amide moieties accounts for the majority of the product. There has been some further reaction to hydroxyester amide end groups ($\sim$25:75 ester:amide moieties).

EXAMPLE 2

Reaction Product of Diamine Containing Four Urea Moieties in its Backbone with $\epsilon$-Caprolactone; $\epsilon$-Caprolactone:Diamine Molar Ratio=3:1

The same diamine containing four urea moieties per average backbone molecule used in Example 1 (178.2 g; 0.0710 mol; MW=2510) and $\epsilon$-caprolactone (24.31 g; 0.213 mol) are combined in the same reaction set up used in Example 1. The reactor is heated at 180° C. for 6 hours. The product is obtained as a viscous liquid: Brookfield viscosity, 206,800 cps at 22° C.; 0.1718 meq amine/g by titration with 0.1N HClO$_4$; 75.5 percent amine conversion; calculated average molecular weight is 2852 by end group titration. Carbon-13 NMR (DMSO-d$_6$) shows amide carbonyl moieties, ester carbonyl moieties, and urea carbonyl moieties.

This example shows the preparation of a product which contains internal urea moieties in its backbone. Some amino end groups ($\sim$24 percent) are still present. Hydroxyl end groups linked by amide moieties accounts for the majority of the product. There has been a large amount of further reaction to hydroxyester amide end groups ($\sim$40:60 ester:amide moieties).

EXAMPLE 3

Reaction Product of Diamine Containing Four Urea Moieties in its Backbone with $\epsilon$-Caprolactone; $\epsilon$-Caprolactone:Diamine Molar Ratio=4:1

The same diamine containing four urea moieties per average backbone molecule used in Example 1 (192.5 g; 0.0767 mol; MW=2510) and $\epsilon$-caprolactone (35.02 g; 0.307 mol) are combined in the same reaction set up used in Example 1. The reactor is heated at 180° C. for 6 hours. The product is obtained as a viscous liquid: Brookfield viscosity, 142,800 cps at 22° C.; 0.0714 meq amine/g by titration with 0.1N HClO$_4$; 89.4 percent amine conversion; calculated average molecular weight is 2966 by end group titration. Carbon-13NMR (DMSO-d$_6$) shows amide carbonyl moieties, ester carbonyl moieties, and urea carbonyl moieties.

This example shows the preparation of a product which contains internal urea moieties in its backbone. A small amount of amino end groups ($\sim$10 percent) are still present. There has been a substantial amount of further reaction to hydroxyester amide end groups ($\sim$52:48 ester:amide moieties).

EXAMPLE 4

Reaction Product of Diamine Containing Six Amide Moieties in its Backbone with $\epsilon$-Caprolactone; $\epsilon$-Caprolactone:Diamine Molar Ratio=4:1

A diamine containing six amide moieties per average backbone molecule is prepared by reaction Jeffamine ™ D-400 with adipic acid using a 1.30:1 molar ratio of Jeffamine ™ D-400:adipic acid. This diamine (201.2 g; 0.1004 mol; MW=2004) and $\epsilon$-caprolactone (45.84 g; 0.402 mol) are combined in the same reaction set up used in Example 1. The reactor is heated at 180° C. for 2 hours. The product is obtained as a viscous liquid: Brookfield viscosity, 129,000 cps at 22° C.; 0.0291 meq amine/g by titration with 0.1N HClO$_4$: 96.4 percent amine conversion; calculated average molecular weight is 2460 by end group titration. Carbon-13NMR (DMSO-d$_6$) shows amide carbonyl moieties, and ester carbonyl moieties. A small amount of $\epsilon$-caprolactone is present.

This example shows the preparation of a product which contains amide moieties in its backbone. Only a very shall amount of amino end groups (<4 percent) are still present. Hydroxy amide end groups accounts for the majority of the product. There has been some further reaction to hydroxylester amide end groups ($\sim$25:75 ester:amide moieties).

EXAMPLE 5

Reaction Product of Diamine Containing Two Amide Moieties and One Urea Moiety in its Backbone with $\epsilon$-Caprolactone; $\epsilon$-Caprolactone:Diamine Molar Ratio=4:1

A diamine containing two amide moieties per average backbone molecule is first prepared by reaction Jeffamine ™ TI D-400 with adipic acid using a 2.00:1 molar ratio of Jeffamine ™ D-400:adipic acid. The diamine product with two amide moieties per average molecule is reacted with urea using a 2.00:1 molar ratio of the diamine to urea. The resultant diamine (188.11 g; 0.0926 mol; MW=1956) and $\epsilon$-caprolactone (43.91 g; 0.3847 mol) are combined in the same reaction set up used in Example 1. The reactor is heated at 180° C. for 2 hours. The product is obtained as a viscous liquid: Brookfield viscosity, 60,600 cps at 22° C.; 0.0267 meq amine/g by titration with 0.1N HClO$_4$; 96.8 percent amine conversion; calculated average molecular weight is 2074 by end group titration. Carbon-13NMR (DMSO-d$_6$) shows amide carbonyl moieties, ester carbonyl moieties, and urea carbonyl moieties. Small amounts of $\epsilon$-caprolactone are also present.

This example shows the preparation of a product which contains both amide and urea moieties in its backbone. Only a very small amount of amino end groups ($\sim$3 percent) are still present. Hydroxyl end groups linked by amide moieties accounts for the majority of the product. There has been a small amount of further reaction to hydroxyester amide end groups ($\sim$15:85 ester:amide moieties).

EXAMPLE 6

Reaction Product of a Diamine Containing Three Thiourea Moieties in its Backbone with ε-Caprolactone; ε-Caprolactone:Diamine Molar Ratio=4:1

A diamine containing three thiourea moieties per average backbone molecule is prepared by reaction Jeffamine ™ D-400 with thiourea using a 1.20:1 molar ratio of Jeffamine ™ TI D-400:thiourea. The resultant diamine (214.9 g; 0.100 mol; MW=2149) and ε-caprolactone (45.66 g; 0.400 mol) are combined in the same reaction set up used in Example 2. The reactor is heated at 180° C. for 42 hours. The product is obtained as a viscous liquid: Brookfield viscosity, 146,000 cps at 22° C.; 0.1466 meq amine/g by titration with 0.1N $HClO_4$; 80.9 percent amine conversion; calculated average molecular weight is 2605 by end group titration. Carbon-13NMR (DMSO-$d_6$) shows amide carbonyl moieties, ester carbonyl moieties, and thiourea carbonyls.

The example shows the preparation of a product which contains thiourea moieties in its backbone. Some amino end groups (~19 percent) are still present. Hydroxyl end groups linked by amide moieties accounts for the majority of the product. There has been some further reaction to hydroxyester amide end groups (~30:70 ester:amide moieties).

EXAMPLE 7

Reaction Product of Jeffamine ™ D-2000 with γ-Butyrolactone; γ-Butyrolactone:Diamine Molar Ratio=2:1

Jeffamine ™ D-2000 (214.78 g; 0.1077 mol; MW=1994.7) and γ-butyrolactone (18.54 g; 0.2154 mol) are combined in the same reaction set up used in Example 1. The reactor is heated at 125° C. for 24 hours. The product is obtained as a viscous liquid: Brookfield viscosity, 1840 cps at 22° C.; 0.1063 meq amine/g by titration with 0.1N $HClO_4$; 88.5 percent amine conversion Carbon-13NMR (DMSO-$d_6$) shows amide carbonyl moieties. No γ-butyrolactone is detected.

This example shows the preparation of a product in which the hydroxyl end groups are derived from γ-butyrolactone. A small amount of amino end groups (~11 percent) are still present. Hydroxyl end groups linked by amide moieties accounts for the majority of the product.

EXAMPLE 8

Reaction Product of a Diamine Containing Three Urea Moieties in its Backbone with γ-Butyrolactone:Diamine Molar Ratio=2:1

A diamine containing three urea moieties per average backbone molecule is prepared by reacting Jeffamine ™ D-400 with urea using a 1.35:1 molar ratio of Jeffamine ™ D-400:urea. This diamine (178.52 g; 0.100 mol; MW=1785) and γ-butyrolactone (17.23 g; 0.200 mol) are combined in the same reaction set up used in Example 1. The reactor is heated at 125° C. for 24 hours. The product is obtained as a viscous liquid: 0.309 meq amine/g by titration with 0.1N $HClO_4$; 69.8 percent amine conversion. Carbon-13NMR (DMSO-$d_6$) shows amide carbonyl moieties and urea carbonyl moieties. A small amount of γ-butyrolactone is present.

The product is heated for an additional 24 hours at 125° C. The product is obtained as a viscous liquid: Brookfield viscosity, 451,000 cps at 22° C.; 0.249 meq amine/g by titration with 0.1N $HClO_4$; 75.6 percent amine conversion. Carbon-13NMR (DMSO-$d_6$) shows amide carbonyl moieties and urea carbonyl moieties. A small amount of γ-butyrolactone is present. This example shows the preparation of a product which contains urea moieties in its backbone. Amine conversion is improved somewhat by additional heating at 125° C. A substantial amount of amino end groups (~29 percent) are still present after heating at 150° C. Hydroxyl end groups linked by amide moieties accounts for the majority of the product.

EXAMPLE 9

Reaction Product of a Diamine Containing Three Urea Moieties in its Backbone with γ-Butyrolactone at 125° C.; γ-Butyrolactone:Diamine Molar Ratio=3:1

The same diamine containing three urea moieties per average backbone molecule used in Example 1 (178.54 g; 0.100 mol; MW=1785) and γ-butyrolactone (25.85 g; 0.300 mol) are combined in the same reaction set up used in Example 1. The reactor is heated at 125° C. for 24 hours. The product is obtained as a viscous liquid: 0.1585 meq amine/g by titration with 0.1N $HClO_4$; 83.8 percent amine conversion. Carbon-13NMR (DMSO-$d_6$) shows amide carbonyl moieties and urea carbonyl moieties. Some unreacted γ-butyrolactone is present.

The product is heated for an additional 24 hours at 125° C. The product is obtained as a viscous liquid: Brookfield viscosity, 84,100 cps at 22° C.; 0.1032 meq amine/g by titration with 0.1N $HClO_4$; 89.4 percent amine conversion. Carbon-13NMR (DMSO-$d_6$) shows amide carbonyl moieties and urea carbonyl moieties. Some unreacted γ-butyrolactone is present.

This example shows the preparation of a product which contains urea moieties in its backbone. Amine conversion is improved by increasing the γ-butyrolactone:diamine molar ratio and by additional heating at 125° C. A small amount of amino end groups (~10 percent) are still present. Hydroxyl end groups linked by amide moieties accounts for the majority of the product.

EXAMPLE 10

Reaction Product of a Diamine Containing Three Urea Moieties in its Backbone with γ-Butyrolactone at 150° C. and 175° C.; γ-Butyrolactone:Diamine Molar Ratio=3:1

The same diamine containing three urea moieties per average backbone molecule used in Example 7 (178.55 g; 0.100 mol; MW=1785) and γ-butyrolactone (25.87 g; 0.300 mol) are combined in the same reaction set up used in Example 1. The reactor is heated at 150° C. for 16 hours. The product is obtained as a viscous liquid: 0.1712 meq amine/g by titration with 0.1N $HClO_4$; 82.5 percent amine conversion. Carbon-13NMR (DMSO-$d_6$) shows amide carbonyl moieties and urea carbonyl moieties. Some unreacted γ-butyrolactone is present.

The product is heated for an additional 6 hours 175° C. The product is obtained as a viscous liquid: Brookfield viscosity, 54,400 cps at 22° C.; 0.2503 meq amine/g by titration with 0.1N $HClO_4$; 74.4 percent amine conversion. Carbon-13NMR (DMSO-$d_6$) shows amide carbonyl moieties and urea carbonyl moieties. Some γ-butyrolactone is present.

This example shows the preparation of a product which contains urea moieties in its backbone. Amine conversion suffers by heating at 150° C. and 175° C. relative to 125° C. A substantial amount of amino end groups (~17 percent) are still present after heating at 150° C. Hydroxyl end groups linked by amide moieties accounts for the majority of the product.

EXAMPLE 11

Reaction Product of a Diamine Containing Three Urea Moieties in its Backbone with γ-Butyrolactone at 125° C.; γ-Butyrolactone:Diamine Molar Ratio=4:1

The same diamine containing three urea moieties per average backbone molecule used in Example 1 (178.52 g; 0.100 mol; MW=1785) and γ-butyrolactone (34.46 g; 0.400 mol) are combined in the same reaction set up used in Example 2. The reactor is heated at 125° C. for 24 hours. The product is obtained as a viscous liquid: 0.0869 meq amine/g by titration with 0.1N HClO$_4$; 90.7 percent amine conversion. Carbon- 13NMR (DMSO-d$_6$) shows amide carbonyl moieties and urea carbonyl moieties. Some γ-butyrolactone is present.

The product is heated for an additional 24 hours at 125° C. The product is obtained as a viscous liquid: Brookfield viscosity, 45,250 cps at 22° C.; 0.0743 meq amine/g by titration with 0.1N HClO$_4$; 92.1 percent conversion. Carbon- 13NMR (DMSO-d$_6$) shows amide carbonyl moieties and urea carbonyl moieties. Some γ-butyrolactone is present.

This example shows the preparation of a product which contains urea moieties in its backbone. Amine conversion is improved by increasing the γ-butyrolactone:diamine molar ratio; also somewhat improved by additional heating at 125° C. Some amino end groups (~8 percent) are still present. Hydroxyl end groups linked by amide moieties accounts for the majority of the product.

A portion of the product obtained after 48 hours at 125° C. (125 g) was dissolved in methylene chloride (200 g) and washed with water (100 ml) in a separatory funnel. The methylene chloride layer was separated, dried over anhydrous sodium sulfate and the solvent removed on a rotary evaporator. Carbon- 13NMR of the purified product showed a substantial reduction in the γ-butyrolactone content.

EXAMPLE 12

Reaction Product of a Diamine Containing Three Urea Moieties in its Backbone with γ-Butyrolactone at 150° C. and 175° C.; γ-Butyrolactone:Diamine Molar Ratio=4.1

The same diamine containing three urea moieties per average backbone molecule used in Example 7 (178.52 g; 0.100 mol; MW=1785) and γ-butyrolactone (34.44 g; 0.400 mol) are combined in the same reaction set up used in Example 1. The reactor is heated at 150° C. for 18 hours. The product is obtained as a viscous liquid: 0.0935 meq amine/g by titration with 0.1N HClO$_4$; 90.0 percent amine conversion. Carbon- 13NMR (DMSO-d$_6$) shows amide carbonyl moieties and urea carbonyl moieties. Some γ-butyrolactone is present.

The product is heated for an additional 6 hours at 175° C. The product is obtained as a viscous liquid: Brookfield viscosity, 33,200 cps at 22° C.; 0. 1790 meq amine/g by titration with 0.1N HClO$_4$; 80.9 percent amine conversion. Carbon- 13NMR (DMSO-d$_6$) shows amide carbonyl moieties and urea carbonyl moieties. Some γ-butyrolactone is still present.

This example shows the preparation of a product which contains urea moieties in its backbone. Amine conversion suffers by heating at 1750° C. Some amino end groups (~10 percent) are still present after heating at 150° C. Hydroxyl end groups linked by amide moieties accounts for the majority of the product.

EXAMPLE 13

Reaction Product of a Diamine Containing Three Thiourea Moieties in its Backbone with γ-Butyrolactone at 125° C; γ-Butyrolactone:Diamine Molar Ratio=3:1

A diamine containing three thiourea moieties per average backbone molecule is prepared by reacting Jeffamine TM D-400 with thiourea using a 1.20:1 molar ratio of Jeffamine TM D-400:thiourea. This diamine (214.9 g; 0.100 mol; MW=2149) and γ-butyrolactone (25.84 g; 0.300 mol) are combined in the same reaction set up used in Example 1. The reactor is heated at 1250° C. for 24 hours. The product is obtained as a viscous liquid: 0.1924 meq amine/g by titration with 0.1N HClO$_4$; 76.8 percent amine conversion Carbon- 13NMR (DMSO-d$_6$) shows amide carbonyl moieties and thiourea carbonyl moieties. Some γ-butyrolactone is present.

The product is heated for an additional 24 hours at 125° C. The product is obtained as a viscous liquid: Brookfield viscosity, 133,400 Cps at 22° C.; 0.192 meq amine/g by titration with 0.1N HClO$_4$; 76.8 percent amine conversion. Carbon- 13NMR (DMSO-d$_6$) shows amide carbonyl moieties and thiourea carbonyl moieties. Some γ-butyrolactone is present.

This example shows the preparation of a product which contains thiourea moieties in its backbone. Amine conversion is not effected by additional heating at 125° C. A substantial amount of amino end groups (~23 percent) are still present. Hydroxyl end groups linked by amide moieties accounts for the majority of the product.

EXAMPLE 14

Reaction Product of a Diamine Containing Four Biuret Moieties in its Backbone with γ-Butyrolactone at 125° C.; γ-Butyrolactone:Diamine Molar Ratio=3:1

A diamine containing four biuret moieties per average backbone molecule is prepared by reacting Jeffamine TM D-400 with biuret using a 1.33:1 molar ratio of Jeffamine TM D-400:biuret. This diamine (231.8 g; 0.100 mol; MW=2318) and γ-butyrolactone (25.87 g; 0.300 mol) are combined in the same reaction set up used in Example 1. The reactor is heated at 125° C. for 24 hours. The product is obtained as a viscous liquid: Brookfield viscosity, 570,000 cps at 22° C.; 0.0869 meq amine/g by titration with 0.1N HClO$_4$; 88.8 percent amine conversion. Carbon-13NMR (DMSO-d$_6$) shows amide carbonyl moieties and biuret carbonyl moieties. A small amount of γ-butyrolactone is present.

This example shows the preparation of a product which contains biuret moieties in its backbone. Some amino end groups (~11 percent) are still present. Hydroxyl end groups linked by amide moieties accounts for the majority of the product.

EXAMPLE 15

Reaction Product of a Diamine Containing Four Amide Moieties in its Backbone with γ-Butyrolactone at 125° C.; γ-Butyrolactone:Diamine Molar Ratio=3:1

A diamine containing four amide moieties per average backbone molecule is prepared by reacting Jeffamine ™ D-400 with adipic acid using a 1.30:1 molar ratio of Jeffamine ™ D-400:adipic acid. This diamine (148.65 g; 0.0574 mol; MW=2590) and γ-butyrolactone (14.81 g; 0.1722 mol) are combined in the same reaction set up used in Example 2. The reactor is heated at 125° C. for 24 hours. The product is obtained as a viscous liquid: Brookfield viscosity, 451,000 cps at 22° C.; 0.0990 meq amine/g by titration with 0.1N $HClO_4$; 85.9 percent amine conversion. Carbon-13NMR (DMSO-$d_6$) shows amide carbonyl moieties. A small amount of γ-butyrolactone is present.

This example shows the preparation of a product which contains amide moieties in its backbone. Some amino end groups (~14 percent) are still present. Hydroxyl end groups linked by amide moieties accounts for the majority of the product.

EXAMPLE 16

Preparation of an Isocyanate Functional Prepolymer prepared from a 90/10 Weight Blend of a polypropyleneoxy polyol and a Four Urea Diamine Capped with ε-Caprolactone A silanized, 100 ml resin kettle with a four necked top is equipped with a mechanical stirrer, thermometer, vacuum inlet and a pressure equalizing addition funnel capped with a rubber septum. The kettle is heated to 55° C. in an oil bath and then charged with 5.36 g (0.0036 equivalents) of the material made in Example 3 and 39.97 g (0.2693 equivalents) of Isonateo 143LM (a cabodiimide-modified diphenylmethane diisocyanate, available from The Dow Chemical Company). The stirrer is then started and the kettle is placed under a vacuum of 0.5 mm Hg. 44.50 g (0.0441 equivalents) of Voranol ® 2120 (a polypropyleneoxy polyol with an average molecular weight of about 2000, available form The Dow Chemical Company) is charged to the addition funnel through the septum via a syringe. The polyol is then added dropwise to the kettle over a 45 minute period while the stirring and vacuum are maintained.

After a reaction time of approximately four hours, a standard HCl/di-n-butylamine titration (ASTM D-1638-74) is done to determine the prepolymer's equivalent weight. The prepolymer's equivalent weight is 416.72 g/equivalent with an NCO content of 10.08 weight percent.

EXAMPLE 17

Preparation of a Polymer Based on 1,4-Butanediol and the Prepolymer made in Example 16

The reaction setup and equipment are used that are used in Example 16. 9.33 g (0.2071 equivalents) of 1,4-butanediol is added to the prepolymer through the septum via a syringe. The mixture is stirred under vacuum for 1.75 minutes and is then poured into a 4"×4"×0.125" steel window mold lined with mylar sheets. The mold is then closed and placed in a 150° C. oven for one hour afterwhich, it is removed and allowed to cool before being opened. The amount of 1,4-butanediol added is calculated to give a hard segment content of 50 weight percent. The Index (ratio of isocyanate groups to hydroxyl groups) is 1.03.

After being removed from the mold, the plaque is post cured at 150° C. for one hour in a vacuum oven and cut apart for testing. Test results are given hereinbelow.

EXAMPLE 18

Preparation of an Isocyanate-Functional Prepolymer from an 80/20 Weight Blend of a polyproplyleneoxy poly and a Four Urea Diamine Capped with ε-Caprolactone (the material made in Example 3)

The reaction setup is the same as used in Example 16. The kettle is heated to 55° C. in an oil bath and then charged with 9.96 g (0.0067 equivalents) of the material made in Example 3 and 40.08 g (0.2798 equivalents) of Isonate ® 143LM. The stirrer is then started and the kettle is placed under a vacuum of 0.5 mm Hg. 39.85 g (0.0395 equivalents) of Voranol ® 2120 is charged to the addition funnel through the septum via a syringe. The Voranol ® 2120 is then added dropwise to the kettle over a 45 minute period while the stirring and vacuum are maintained.

After a reaction time of approximately two hours, a standard HCl/di-n-butylamine titration is done to determine the prepolymer's equivalent weight. The prepolymer's equivalent weight. The prepolymer's equivalent weight is 377.37 g/equivalent with an NCO content of 11.13 weight percent.

EXAMPLE 19

Preparation of a Polymer Based on 1,4-Butanediol and the Prepolymer made in Example 18.

The reaction setup and equipment are used that are used in Example 18. 10.35 g (0.2297 equivalents) of 1,4-butanediol is added to the prepolymer through the septum via a syringe. The mixture is stirred under vacuum for 1.30 minutes and is then poured into a 4"×4"×0.125" steel window mold lined with mylar sheets. The mold is then closed and placed in a 150° C. oven for one hour afterwhich, it is removed and allowed to cool before being opened. The amount of 1,4-butanediol added is calculated to give a hard segment content of 50 weight percent. The Index is 1.03.

After being removed from the mold, the plaque is post cured at 150° C. for one hour in a vacuum oven and cut apart for testing. Test results are given hereinbelow.

EXAMPLE 20

Preparation of an Isocyanate-Functional Prepolymer from a 70/30 Weight Blend of a polypropyleneoxy polyol and a Four Urea Diamine Capped with ε-Caprolactone (the material made in Example 3).

The reaction setup is the same as that used in Example 16. The kettle is heated to 55° C. in an oil bath and then charged with 15,48 g (0.0104 equivalents) of the material made in Example 3 and 40.08 g (0.2701) equivalents) of Isonate ® 143LM. The stirrer is then started and the kettle is placed under a vacuum of 0.5 mm Hg. 34.93 g (0.0347 equivalents) of Voranol ® 2120 is charged to 0.5 mm Hg. 34.93 g (0.0347 equivalents) of Voranol ® 2120 is charged to the addition funnel through the septum via a syringe. The Voranol ® 2120 is then added dropwise to the kettle over a 45 minute period while the stirring and vacuum are maintained.

After a reaction time of approximately four hours, a standard HCl/di-n-butylamine titration is done to determine the prepolymer's equivalent weight. The prepolymer's equivalent weight is 389.1 g/equivalent with an NCO content of 10.79 weight percent.

EXAMPLE 21

Preparation of a Polymer Based on 1,4-Butanediol and the Prepolymer made in Example 20.

The reaction setup and equipment are sued that are used in Example 20. 10.05 g (0.2230 equivalents) of 1,4-butanediol is added to the prepolymer through the septum via a syringe. The mixture is stirred under vacuum for 1.5 minutes. The vacuum is then broken and the contents of the kettle poured into a 4"×4"×0.125" steel window mold lined with mylar sheets. The mold is then closed and placed in a 150° C. oven for one hour afterwhich, it is removed and allowed to cool before being opened. The amount of 1,4-butanediol added is calculated to give a hard segment content of 50 weight percent. The Index is 1.04.

After being removed from the mold, the plaque is post cured at 150° C. for one hour in a vacuum oven and cut apart for testing. Test results are given hereinbelow.

EXAMPLE 22

Preparation of an Isocyanate-Functional Prepolymer from an 80/20 Weight Blend of a polypropyleneoxy polyol and a Diamine Containing Two Amide Moieties and One Urea Moiety and Capped with ε-Capro-lactone (the material made in Example 5).

The reaction setup is the same as that used in Example 16. The kettle is heated to 55° C. in an oil bath and then charged with 10.63 g (0.0103 equivalents) of the material made in Example 5 and 40.01 g (0.2793 equivalents) of Isonate ® 143LM. The stirrer is then started and the kettle is placed under a vacuum of 0.5 mm Hg. 39.55 g (0.0403 equivalents) of Voranol ® 2120 is charged to the addition funnel through the septum via a syringe. The Voranol ® 2120 is then added dropwise to the kettle over a 45 minute period while the stirring and vacuum are maintained.

After a reaction time of approximately three hours, a standard HCl/di-n-butylamine titration is done to determine the prepolymer's equivalent weight. The prepolymer's equivalent weight is 403.57 g/equivalent with an NCO content of 10.41 weight percent.

EXAMPLE 23

Preparation of a Polymer Based on 1,4-Butanediol and the Prepolymer made in Example 22.

The reaction setup and equipment are used that are used in Example 22. 9.72 g (0.2157 equivalents) of 1,4-butanediol is added to the prepolymer through the septum via a syringe. The mixture is stirred under vacuum for approximately 1.5· minutes. The vacuum is then broken and the contents of the kettle poured into a 4"×4"×0.125" steel window mold lined with mylar sheets. The mold is then closed and placed in a 150° C. oven for one hour afterwhich, it is removed and allowed to cool before being opened. The amount of 1,4-butanediol added is calculated to give a hard segment content of 50 weight percent. The Index is 1.03.

After being removed from the mold, the plaque is post cured at 150° C. for one hour in a vacuum oven and cur apart for testing. Test results are given hereinbelow.

EXAMPLE 24

Preparation of an Isocyanate-Functional Prepolymer from an 80/20 Weight Blend of a polypropyleneoxy polyol and a Three Thiourea Diamine Capped with ε-Caprolactone (the material made in Example 6).

The reaction setup is the same as that used in Example 16. The kettle is heated to 550° C. in an oil bath and then charged with 10.36 g (0.0089 equivalents) of the material made in example 6 and 40.04 g (0.2730 equivalents) of Isonateo 143LM. The stirrer is then started and the kettle is placed under a vacuum of 0.5 mm Hg. 39.56 g (0.0403 equivalents) of Voranol ® 2120 is charged to the addition funnel through the septum via a syringe. The Voranol ® 2120 is then added dropwise to the kettle over a 45 minute period while the stirring and vacuum are maintained.

After a reaction time of approximately three hours, a standard HCl/di-n-butylamine titration is done to determine the prepolymer's equivalent weight. The prepolymer's equivalent weight is 395.60 g/equivalent with an NCO content of 10.62 weight percent.

EXAMPLE 25

Preparation of a Polymer Blend Based on 1,4-Butanediol and the Prepolymer made in Example 24

The reaction setup and equipment are used that are used in Example 24. 9.87 g (0.2190 equivalents) of 1,4-butanediol is added to the prepolymer through the septum via a syringe. The mixture is stirred under vacuum for approximately 2.0 minutes. The vacuum is then broken and the contents of the kettle poured into a 4"×4"×0.125" steel window mold lined with mylar sheets. The mold is then closed and placed in a 150° C. oven for one hour afterwhich, it is removed and allowed to cool before being opened. The amount of 1,4-butanediol added is calculated to give a hard segment content of 50 weight percent. The Index is 1.03.

After being removed from the mold, the plaque is post cured at 150° C. for one hour in a vacuum oven and cut apart for testing. Test results are given hereinbelow.

EXAMPLE 26

Preparation of an Isocyanate-Functional Prepolymer from an 80/20 Weight Blend of a polypropyleneoxy polyol and a Six Amide Diamine Capped with γ-Butyrolactone (the material made in Example 15).

The reaction setup is the same as that used in Example 16. The kettle is heated to 55° C. in an oil bath and then charged with 10.23 g (0.0077 equivalents) of the material made in Example 15 and 40.02 g (0.2784 equivalents) of Isonate ® 143LM. The stirrer is then started and the kettle is placed under a vacuum of 0.5 mm Hg. 39.94 g (0.0396 equivalents) of Voranol ® 2120 is charged to the addition funnel through the septum via a syringe. The Voranol ® 2120 is then added dropwise to the kettle over a 45 minute period while the stirring and vacuum are maintained.

After a reaction time of approximately four hours, a standard HCl/di-n-butylamine titration is done to determine the prepolymer's equivalent weight. The prepolymer's equivalent weight as 379.36 g/equivalent with an NCO content of 11.07 weight percent.

EXAMPLE 27

Preparation of a Polymer Based on 1,4-Butanediol and the Prepolymer made in Example 26.

The reaction setup and equipment are used that are used in Example 26. 8.00 g (0.1775 equivalents) of 1,4-butanediol is added to the prepolymer through the septum via a syringe. The mixture is stirred under vacuum for approximately 1.25 minutes. The vacuum is then broken and the contents of the kettle poured into a 4"×3"×0.125" steel window mold lined with mylar sheets. The mold is then closed and placed in a 150° C. oven for one hour afterwhich, it is removed and allowed to cool before being opened. The amount of 1,4-butanediol added is calculated to give a hard segment content of 50 weight percent. The Index is 1.03.

After being removed from the mold, the plaque is post cured at 150° C. for one hour in a vacuum oven and cut apart for testing. Test results are given hereinbelow.

EXAMPLE 28

Preparation of an Isocyanate-Functional Prepolymer from a 80/20 Weight Blend of a polypropyleneoxy polyol and a Four Biuret Diamine Capped with γ-Butyro-lactone (the material made in Example 14).

The reaction setup is the same as that used in Example 16. The kettle is heated to 55° C. in an oil bath and then charged with 9.95 g (0.0084 equivalents) of the material made in Example 14 and 40.09 g (0.2733 equivalents) of Isonate ® 143LM. The stirrer is then started and the kettle is placed under a vacuum of 0.5 mm Hg. 40.17 g (0.0409 equivalents) of Voranol ® 2120 is charged to the addition funnel through the septum via a syringe. The Voranol ® 2120 is then added dropwise to the kettle over a 45 minute period while the stirring and vacuum are maintained.

After a reaction time of approximately four hours, a standard HCl/di-n-butylamine titration is done to determine the prepolymer's equivalent weight. The prepolymer's equivalent weight is 410.98 g/equivalent with an NCO content of 10.22 weight percent.

EXAMPLE 29

Preparation of a Polymer Based on 1,4-Butanediol and the Prepolymer made in Example 28

The reaction setup and equipment are used that are used in Example 28. 9.55 g (0.2119 equivalents) of 1,4-butanediol is added to the prepolymer through the septum via a syringe. The mixture is stirred under vacuum for approximately 1.50 minutes. The vacuum is then broken and the contents of kettle poured into a 4"×4"×0.125" steel window mold lined with mylar sheets. The mold is then closed and placed in a 150° C. oven for one hour afterwhich, it is removed and allowed to cool before being opened. The amount of 1,4-butanediol added is calculated to give a hard segment content of 50 weight percent. The Index is 1.03.

After being removed from the mold, the plaque is post cured at 150° C. for one hour in a vacuum oven and cut apart for testing. Test results are given hereinbelow.

EXAMPLE 30

Preparation of an Isocyanate-Functional Prepolymer a 80/20 Weight Blend of a polypropyleneoxy polyol and a Three Thiourea Diamine Capped with γ-Butyro-lactone (the material made in Example 10).

The reaction setup is the same as that used in Example 16. The kettle is heated to 55° C. in an oil bath and then charged with 10.14 g (0.0109 equivalents) of the material made in Example 10 and 40.18 g (0.2739 equivalents) of Isonate ® 143LM. The stirrer is then started and the kettle is placed under a vacuum of 0.5 mm Hg. 39.14 g (0.0398 equivalents) of Voranol ® 2120 is charged to the addition funnel through the septum via a syringe. The Voranol ® 2120 is then added dropwise to the kettle over a 45 minute period while the stirring and vacuum are maintained.

After a reaction time of approximately four hours, a standard HCl/di-n-butylamine titration is done to determine the prepolymer's equivalent weight. The prepolymer's equivalent weight is 393.99 g/equivalent with an NCO content of 10.66 weight percent.

EXAMPLE 31

Preparation of a Polymer Based on 1,4-Butanediol and the Prepolymer made in Example 30.

The reaction setup and equipment are used that are used in Example 30. 9.86 g (0.2188 equivalents) of 1,4-butanediol is added to the prepolymer through the septum via a syringe. The mixture is stirred under vacuum for approximately 1.30 minutes. The vacuum is then broken and the contents of the kettle poured into a 4"×4"×0.125" steel window mold lined with mylar sheets. The mold is then closed and placed in a 150° C. oven for one hour afterwhich, it is removed and allowed to cool before being opened. The amount of 1,4-butanediol added is calculated to give a hard segment content of 50 weight percent. The Index is 1.03.

After being removed from the mold, the plaque is post cured at 150° C. for one hour in a vacuum oven and cut apart for testing. Test results are given hereinbelow.

TABLE 1

Physical Property Data for Examples 17, 19, 21, 23, 25, 27, 29, and 31 measured at 25° C.

| Example | Percent Additive | Flexural Storage Modulus E' (Kpsi) | C.L.T.E. ($\times 10^{-6}$/°C.) | Backbone of Additive |
|---|---|---|---|---|
| 17 | 10% | 18.55 | 194 | Urea |
| 19 | 20% | 22.20 | 191 | Urea |
| 21 | 30% | 36.76 | 187 | Urea |
| 23 | 20% | 22.15 | 192 | 2-Amide/-1-Urea |
| 25 | 20% | 18.42 | 121 | Thiourea |
| 27 | 20% | 19.07 | 190 | Amide |
| 29 | 20% | 21.30 | 193 | Biuret |
| 31 | 20% | 23.35 | 190 | Urea |

These results show that the ambient temperature flexural storage modulus improves (increases) and the C.L.T.E. improves (decreases) as the amount of backbone modified diamine, which is used as an additive in the polymer, is increased. The extent of improvement is a function of the particular backbone modification of the diamine and the cyclolactone used to cap it. Improved modulus results in a stirrer polymer, while the

27 improved C.L.T.E. results in better dimensional stability of the polymers.

What is claimed is:

1. A modified polyahl comprising
   (a) a backbone portion containing at least one polyalkleneoxy moiety and one or more internal urea, amide, biuret, thiourea, dithiobiuret, or thioamide moieties,
   (b) end groups selected from the group consisting of amino, hydroxy amide or hydroxyester amide, wherein at least one end group is hydroxy amide or hydroxyester amide, wherein each internal urea, amide, biuret, thiourea, dithiobiuret, or thioamide moiety is separated from each other and from each end group by at least one alkylene, cycloalkylene, aralkylene, arylene, or alkyleneoxy moiety with 4–20 carbon atoms, or at least one polyalkyleneoxy moiety containing from 2–50 alkyleneoxy units.

2. The modified polyahl of claim 1 which contains at least one internal urea moiety.

3. The modified polyahl of claim 1 which contains at least one internal amide moiety.

4. The modified polyahl of claim 1 which contains at least one internal biuret moiety.

5. The modified polyahl of claim 1 which contains at least one internal thiourea moiety.

6. The modified polyahl of claim 1 which contains at least one internal dithiobiuret moiety.

7. The modified polyahl of claim 1 which contains at least one internal thioamide moiety.

8. The modified polayhl of claim 1 which contains at least one hydroxy amide end group.

9. The modified polayhl of claim 1 which contains at least one hydroxyester amide end group.

10. The modified polyahl of claim 1 represented by the formula:

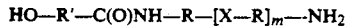

HO—R'—C(O)NH—R—[X—R]$_m$—NH$_2$ wherein each R is independently in each occurrence an alkylene, cycloalkylene, aralkylene, aryl, alkyleneoxy, or polyalkyleneoxy moiety, wherein at least one R is polyalkyleneoxy; R' is independently in each occurrence a C$_{3-12}$ alkyl groups which may be inertly substituted; X is independently in each occurrence an acyclic moiety selected from the group consisting of urea, biuret, thiourea, dithiobiuret, amide, and thioamide; and m is an integer between 1 and 50.

11. The modified polyahl of claim 1 represented by the formula:

HO—R'—C(O)NH—R—[X—R]$_m$—NHC(O)—R'—OH wherein each R is independently in each occurrence an alkylene, cycloalkylene, aralkylene, aryl, alkyleneoxy, or polyalkyleneoxy moiety, wherein at least one R is polyalkyleneoxy; R' is independently in each occurrence a C$_{3-12}$ alkyl groups which may be inertly substituted; X is independently in each occurrence an acyclic moiety selected from the group consisting of urea, biuret, thiourea, dithiobiuret, amide, and thioamide; and m is an integer between 1 and 50.

28

12. The modified polyahl of claim 1 represented by the formula:

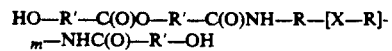

HO—R'—C(O)O—R'—C(O)NH—R—[X—R]$_m$—NHC(O)—R'—OH wherein each R is independently in each occurrence an alkylene, cycloalkylene, aralkylene, aryl, alkyleneoxy, or polyalkyleneoxy moiety, wherein at least one R is polyalkyleneoxy; R' is independently in each occurrence a C$_{3-12}$ alkyl groups which may be inertly substituted; X is independently in each occurrence an acyclic moiety selected from the group consisting of urea, biuret, thiourea, dithiobiuret, amide, and thioamide; and m is an integer between 1 and 50.

13. The modified polyahl of claim 1 represented by the formula:

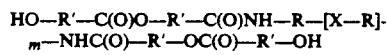

HO—R'—C(O)O—R'—C(O)NH—R—[X—R]$_m$—NHC(O)—R'—OC(O)—R'—OH wherein each R is independently in each occurrence an alkylene, cycloalkylene, aralkylene, aryl, alkyleneoxy, or polyalkyleneoxy moiety, wherein at least one R is polyalkyleneoxy; R' is independently in each occurrence a C$_{3-12}$ alkyl groups which may be inertly substituted; X is independently in each occurrence an acyclic moiety selected from the group consisting of urea, biuret, thiourea, dithiobiuret, amide, and thioamide; and m is an integer between 1 and 50.

14. A process for the preparation of the polyahl of claim 1 which comprises contacting a cyclic lactone with a modified polyamine comprising a backbone portion containing at least one polyalkyleneoxy moiety and one or more internal urea, amide, biruet, thiourea, dithiobiuret, or thioamide moieties, and a plurality of primary amino groups wherein each amino group is separated from each urea, amide, biuret, thiourea, dithiobiuret, or thioamide moiety by at least one alkylene, cycloalkylene, aralkylene, arylene, or alkyleneoxy moiety with 4–20 carbon atoms, or at least one polyalkyleneoxy moiety containing from 2–50 alkyleneoxy units, under reaction conditions sufficient to form the modified polyahl.

15. The process of claim 10 which is carried out at a reaction temperature in the range of from about 100° C. to about 200° C.

16. An isocyanate-functional prepolymer comprising the reaction product of the modified polyahl of claim 1 with at least one organic polyisocyanate such that the reaction product has terminal isocyanate moieties.

17. An isocyanate-functional prepolymer comprising the reaction product of the modified polyahl of claim 2 with at least one organic polyisocyanate such that the reaction product has terminal isocyanate moieties.

18. An isocyanate-functional prepolymer comprising the reaction product of the modified polyahl of claim 4 with at least one organic polyisocyanate such that the reaction product has terminal isocyanate moieties.

19. A polymer comprising the reaction product of the isocyanate-functional prepolymer of claim 16 and at least one active hydrogen-containing compound.

20. A urethane/urea polymer comprising the reaction the modified polyahl of claim 1 with at least one organic polyisocyanate.

* * * * *